United States Patent [19]

Peckman et al.

[11] Patent Number: 4,635,314
[45] Date of Patent: Jan. 13, 1987

[54] ARRANGEMENT FOR REMOVING GLASS SOOT FROM AN EXHAUST TUBE DURING OPTICAL PREFORM FABRICATION

[75] Inventors: Robert Peckman; Kamran Karbassiyoon, both of Roanoke, Va.

[73] Assignee: ITT Corporation, New York, N.Y.

[21] Appl. No.: 859,860

[22] Filed: May 1, 1986

Related U.S. Application Data

[63] Continuation of Ser. No. 723,225, Apr. 15, 1985, abandoned.

[51] Int. Cl.⁴ .............................................. B08B 5/02
[52] U.S. Cl. .................................. 15/304; 15/316 R; 65/11.1
[58] Field of Search .................. 15/304, 316 R; 65/3, 65/12, 11.1, 144

[56] References Cited

U.S. PATENT DOCUMENTS

| | | | |
|---|---|---|---|
| 2,302,078 | 11/1942 | Wadman | 15/304 X |
| 2,309,325 | 1/1943 | Merrill | 15/304 X |
| 2,604,358 | 7/1952 | Richards | 15/317 X |
| 2,669,217 | 2/1954 | Pearson | 15/318 X |
| 4,278,459 | 7/1981 | Partus | 65/18 |
| 4,389,229 | 6/1983 | Jang et al. | 65/3.12 |

FOREIGN PATENT DOCUMENTS 2143519A 2/1985 United Kingdom .

Primary Examiner—Chris K. Moore
Attorney, Agent, or Firm—John T. O'Halloran; Mary C. Werner

[57] ABSTRACT

An arrangement for introducing an auxiliary gaseous medium into the interior of an exhaust tube that is joined to a downstream end of a substrate tube from which a primary gaseous medium carrying glass soot particles during a chemical vapor deposition phase of an optical preform fabrication process emerges into the exhaust tube comprises a gas injection tube which is partly received in the exhaust tube with radial spacing therefrom except at a contact zone and having a free end disposed at the region of joinder of the exhaust tube with the substrate tube. The auxiliary gaseous medium flows through the gas injection tube into the joinder region for mixing thereat with the emerging flow of the primary gaseous medium. Relative circumferential movement is effected between the contact zone and at least the exhaust tube to release any soot present at the contact zone for entrainment in the mixed flow through the spacing and out of the exhaust tube. The gas injection tube lies at the bottom of the interior of the exhaust tube which rotates during the deposition phase in one sense, while the gas injection tube is being rotated in the opposite sense, so that soot accumulations are scraped off of both the internal surface of the exhaust tube and the external surface of the gas injection tube as such surfaces move past the contact zone.

11 Claims, 1 Drawing Figure

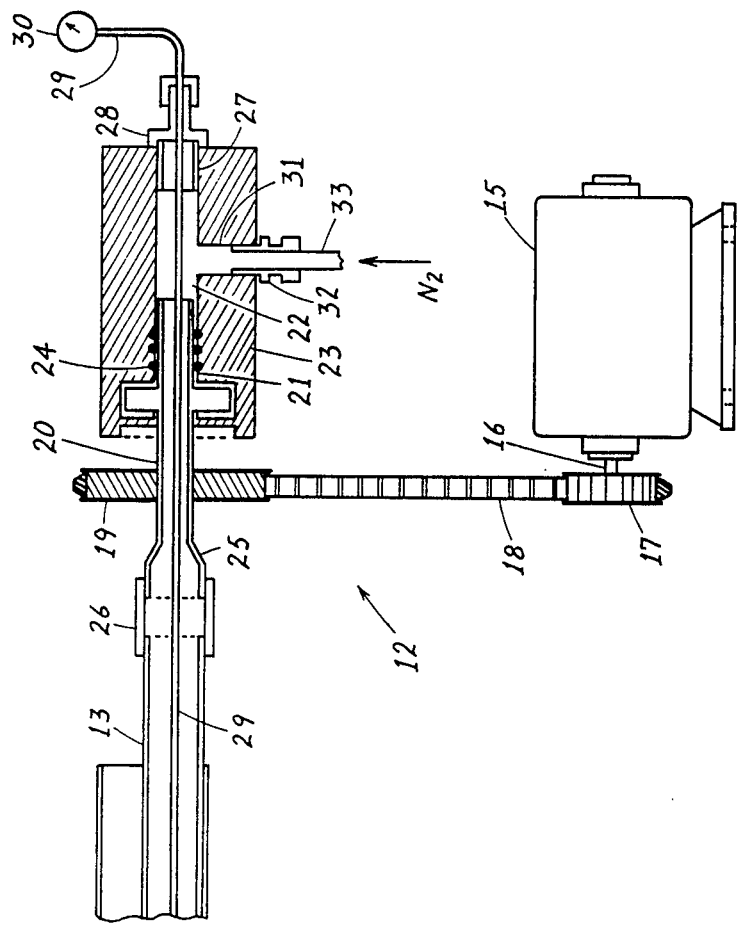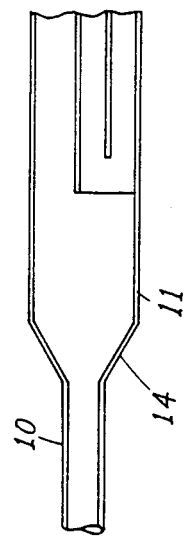

ARRANGEMENT FOR REMOVING GLASS SOOT FROM AN EXHAUST TUBE DURING OPTICAL PREFORM FABRICATION

This application is a continuation of application Ser. No. 723,225, filed Apr. 15, 1985, and now abandoned.

BACKGROUND OF THE INVENTION

The present invention relates to optical preform fabrication in general, and more particularly to an arrangement for removing glass soot tending to accumulate in the interior of an exhaust tube during a chemical vapor deposition phase of the preform fabrication process.

There is already known and in use a technique of fabricating optical fiber preforms which involves a phase that is sometimes called a modified chemical vapor deposition process. During this fabrication phase, which will be hereafter occasionally referred to as chemical vapor deposition phase, a gaseous medium containing certain glass precursors, especially halides or other compounds of glass forming or doping elements, such as silicon, boron, germanium, phosphorus or the like, as well as on oxidizing agent, such as oxygen, is caused to flow through the interior of a substrate tube which is usually rotated about its longiutudinal axis and is heated from the outside, for instance by an oxyhydrogen flame applied to the external surface of the substrate tube, so that chemical reactions take place at and/or downstream of the heated region of the substrate tube with attendant conversion of the glass precursors into glass materials which become deposited in the form of at least one layer at the internal surface of the substrate tube.

During this phase, glass soot that is constituted by minute particles of the glass materials is formed at or downstream of the heated region and is then carried by the gaseous medium out of the downstream end of the substrate tube and into what is called an exhaust tube. This exhaust tube is a glass tube with an enlarged diameter with respect to the substrate tube and fused to the downstream end of the substrate tube at a merger or joinder region, so that it shares in the rotational movement of the substrate tube. Experience has shown that the soot which reaches the interior of the exhaust tube tends to deposit therein and form accumulations which, in effect, reduce the flow-through cross-sectional area of the exhaust tube. Such accumulations could then interfere with the performance of the chemical vapor deposition process and ultimately with the properties of the layer or layers deposited in the substrate tube by changing the deposition parameters, such as pressure, flow speed of the gaseous medium or the like, from those originally selected.

The method that is currently most commonly used to avoid this problem by removing the soot from the exhaust tube before the soot accumulations can cause any significant change in the deposition parameters is for the operator of the lathe on which the preform is being fabricated to periodically scrape the interior of the exhaust tube using a quartz rod which is approximately one meter long to reach all the way into the exhaust tube. Once loosened, the soot is then drawn from the exhuast tube with the same quartz rod using a series of raking motions. It was established that this soot removal technique suffers of several disadvantages. One of such drawbacks of this techqnique is that it requires frequent operator intervention in an otherwise automated process. Also, the use of this technique can subject the preform being fabricated to severe contamination, since some of the loosened soot can be returned into the interior of the substrate and become a part of the layer being formed therein.

SUMMARY OF THE INVENTION

Accordingly, it is an object of the present invention to avoid the disadvantages of the prior art.

More particularly, it is an object of the present invention to provide an arrangement for removing glass soot from the interior of an exhaust tube during a chemical vapor deposition phase of a preform fabrication process, which arrangement avoids the disadvantages of the previous approaches to this problem.

Still another object of the present invention is to construct the arrangement of the type here under consideration in such a manner as to make it possible to achieve full automation of the soot removal operation.

It is yet another object of the present invention so to design the arrangement of the above type as to eliminate the danger of contamination of the layer being deposited in the substrate tube preceding the exhuast tube by the loosened soot, or at least to reduce this danger to an acceptable level.

A concomitant object of the present invention is to develop an arrangement of the above type which is simple in construction, relatively inexpensive to manufacture, easy to install and use, and reliable in operation nevertheless.

In pursuance of these objects and others which will become hereafter, one feature of the present invention resides in an arrangement for introducing an auxiliary gaseous medium into the interior of an exhaust tube that is joined to a downstream end of a substrate tube from which a primary gaseous medium carrying glass soot particles during a chemical vapor deposition phase of an optical preform fabrication process emerges substantially coaxially into the exhaust tube, this arrangement comprising a gas injection tube including a tubular portion received in the exhaust tube with radial spacing therefrom except at a contact zone and having a free end disposed at the region of joinder of the exhaust tube with the substrate tube; means for supplying the auxiliary gaseous medium into said gas injection tube for propagation through the same toward and out of said free end and into said region for mixing thereat with the emerging flow of the primary gaseous medium for joint flow through said spacing; and means for effecting relative circumferential movement between said contact zone and at least the exhaust tube to release any soot accumulations present at said contact zone for entrainment of the released soot in the joint flow through said spacing and out of said exhaust tube.

A particular advantage of the arrangement as described so far is that it excellently lends itself to a full automation of the soot removal, without need for any physical intervention on the part of the operator. Also, since the soot accumulation in the exhaust tube, if any, takes place at the downstream side of the region at which the two gaseous media mix with one another, there is virtually no possibility that such soot could be returned into the interior of the substrate tube and contaminate the layer being formed therein. An additional advantage of this approach and arrangement is that it makes it possible to control the pressure in the substrate tube not only during the chemical vapor deposition phase but during other phases of the optical preform fabrication process, to the extent called for, as well.

BRIEF DESCRIPTION OF THE DRAWING

Above-mentioned and other features and objects of this invention will become more apparent by reference to the following description taken in conjunction with the accompanying drawing of which the sole FIGURE is a diagrammatic representation of the soot removal arrangement of the present invention and the environment of its use.

DETAILED DESCRIPTION OF THE PREFERRED EMBODIMENT

Referring now to the drawing in detail, it may be seen that the reference numeral 10 has been used therein to identify a substrate tube which is to be provided in its interior with at least one layer of at least one optical glass material and/or further processed in the course of fabrication of an optical preform. During such fabrication, the substrate tube 10 is supported in a well-known manner on a lathe for rotation about its longitudinal axis, and is acutally rotated about such axis at least during the formation of the aforementioned layer in its interior. This layer is formed at the internal surface of the substrate tube 10 in the course of a chemical vapor deposition phase of an optical preform fabrication process, during which phase the optical material to be deposited is converted from a gas or vapor state precursor material present in a flow of a primary gaseous medium through the interior of the substrate tube 10 into a solid state material by application of heat to the precursor material, especially by applying a flame generated by a torch to the exterior of the substrate tube 10 for the thus applied heat to penetrate through the substrate tube 10 and heat up the primary gaseous medium. This process is well known to those active in this field so that it is not deemed to be necessary to describe the same in any more detail.

During the chemical vapor deposition phase of the preform fabrication process, there is also formed so-called glass soot which is constituted by minuscule particles of the solid glass material, such as oxides of silicon, germanium: phosphorus or boron, that are entrained in the flow of the primary gaseous medium through the interior of the substrate tube 10 for travel to and beyond the downstream end of the substrate tube 10 and into an exhaust tube 11 which is connected to the downstream end of the substrate tube 10 and constitutes an increased-diameter extension of the substrate tube 10 which extends in the downstream direction beyond the downstream end of the substrate tube 10. The soot, if permitted to gradually accumulate in the interior of the exhaust tube 11, would eventually interfere with the flow of the primary gaseous medium through the interior of the substrate tube 10. Therefore, it is desirable to remove such soot from the interior of the exhaust tube 11 before the occurrence of any substantial accumulation of the soot in the interior of the exhaust tube 11.

According to the present invention, this soot removal is accomplished by means of a soot removal apparatus which is generally indicated at 12. The soot removal apparatus 12 includes, as one of its main components, a gas injection tube 13 through which an auxiliary gaseous medium, especially an inert gas such as nitrogen, is introduced into the interior of the exhaust tube 11 and to a region 14 at which the exhaust tube 11 merges with the substrate tube 10 and which substantially conically diverges in the downstream direction as considered in the direction of flow of the primary gaseous medium through the interior of the substrate tube 10. Thus, at the merger region 14, the auxiliary gaseous medium flows in countercurrent to the primary gaseous medium emerging from the interior of the substrate tube 10 into the merger region 14, which results in a pronouncedly turbulent or irregular flow pattern at and downstream from the merger region 14, with attendant agitation of any soot which may have already deposited, or has a tendency to deposit, at or downstream of the merger region 14. This effect is particularly pronounced due to the fact that, as shown in the drawing, the longitudinal axis of the gas injection tube 13, albeit substantially parallel to that of the exhaust tube 11 which in turn substantially or exactly coincides with the longitudinal axis of the substrate tube 10, is transversely offset from the longitudinal axis of the exhaust tube 11, so that the flow of the auxiliary gaseous medium emerging from the 13 is aimed at the substantially conical internal surface of the merger region 14 which then diverts such flow prior to its mixing with the flow of the primary gaseous medium emerging substantially coaxially from the interior of the substrate tube 10 into the merger region 14.

The agitating or soot-removal effect is further enhanced by the fact that the gas injection tube 13 is supported on or in contact with the instantanous bottom zone of the internal surface of the exhaust tube 11 or with any soot which may be situated thereat. This means that, to the extent that the soot particles present at this zone are loose, or able to become loose as a result of the contact with the external surface of the gas injection tube 13, they will be introduced into and entrained in the mixed flow of the primary and auxiliary media through the interior of the exhaust tube 11 and around the exterior of the gas injection tube 13.

Experience has shown that, because of the rather violent character of the flow at and downstream of the merger region 14, the soot particles usually do not begin to settle in the interior of the exhaust tube 11 until they have reached a settlement region situated a sizable distance downstream from the merger region 14 and ordinarily in the space between the interior of the exhaust tube 11 and the exterior of the gas injection tube 13. At this settlement region, however, the soot particles have a tendency to adhere to one another and/or to the internal surface of the exhaust tube 11 and/or to the external surface of the gas injection tube 13. To counteract this tendency and to release the soot particles for entrainment into the mixed flow of the gaseous media through the space between the exhaust tube 11 and the gas injection tube 13 for carrying such released soot particles out of the interior of the exhaust tube 11, the gas injection tube 13 acts as a scraper for the internal surface of the exhaust tube 11. To this end, it is provided for the external surface of the gas injection tube 13 to conduct relative movement in the circumferential direction with respect to the internal surface of the exhaust tube 11.

As illustrated in the drawing, this is preferably achieved by mounting the gas injection tube 13 for rotation about its longitudinal axis, and by causing the gas injection tube 13 to rotate at least during the chemical vapor deposition phase of the preform fabrication process. This rotation of the gas injection tube 13 is preferably in a sense opposite to that in which the substrate tube 10 and the exhaust tube 11 rotate, so that the two circumferential surfaces which face one another move in the opposite circumferential directions at the aforementioned instantaneous bottom zone. This results in the advantage that a relatively high relative speed is achieved between these cooperating circumferential surfaces even at relatively low or moderate speeds of rotation of the exhaust tube 11 and of the gas injection tube 13, with attendant high efficiency of the scraping action. Another advantage achieved thereby is that the internal surface of the exhaust tube 11 performs a scraping action on the external surface of the gas injection tube 13 at the same time that the external surface of the gas injection tube 13 performs its scraping action on the internal surface of the exhaust tube 11, so that accumulated soot is removed not only from the internal surface of the exhaust tube 11 but also from the external surface of the gas injection tube 13.

This rotational movement of the gas injection tube 13 is brought about by the action of a motor 15 which is preferably constructed as a fractional horsepower variable speed motor. The motor 15 has an output shaft 16 on which there is mounted for rotation a first pulley 17. An endless transmission element 18, which is illustrated as being of the toothed transmission belt type, is trained around the first pulley 17 as well as around a second pulley 19 which is mounted for joint rotation on a tubular connecting element 20. The tubular connecting element 20 has a mounting portion 21 which is mounted for rotation in an internal passage 22 of a stationary rotary gas union 23 and is sealed in the internal passage 22 by a sealing ring arrangement 24. Another portion 25 of the tubular connecting element 20 is connected, in a sealingly communicating manner, by means of a flexible plastic coupling 26 of a known construction, to the end of the gas injection tube 13 that is remote from the merger region 14. Thus, the rotation of the output shaft 16 of the motor 15 results in the rotation of the tubular connecting element 20 and, via the coupling 26, of the gas injection tube 13.

The internal passage 22 of the rotary gas union 23 terminates, at its end remote from the mounting portion 21, in a first port 27. A first plug 28 sealingly closes the first port 27, except for the penetration of a deposit pressure sensor tube 29 therethrough. The deposit pressure sensor tube 29 leads from a measuring region situated at the upstream end of the gas injection tube 13 and, as shown, in the interior of the gas injection tube 13, to a deposit pressure manometer 30 which measures the pressure prevailing at the measuring region. This pressure is indicative of the operating conditions encountered at least during the chemical vapor deposition phase of the preform fabrication process. An auxiliary port 31 opens into the internal passage 22 substantially transversely of the latter between the mounting portion 21 and the first port 27. The auxiliary port 31 is again sealingly closed by another plug 32, with an auxiliary feeding duct 33 passing through the plug 32. The auxiliary feeding duct 33 serves for the admission of the auxiliary gaseous medium into the internal passage 22 from where it then propagates through the interior of the tubular connecting element 20, that of the coupling 26, and the interior of the gas injection tube 13 toward the merger region 14.

It was found to be advantageous for the gas injection tube 13 to be made of quartz and to have an outer diameter of about 25 millimeters, and to introduce the gas injection tube 13 into the interior of the exhaust tube 11 to such an extent that its free end rests at a distance of approximately 5 centimeters downstream from the location at which the substrate tube 10 merges with the exhaust tube 11. The deposit pressure sensor tube 29 is advantageously made of stainless steel and has an outer diameter of approximately ⅛". As a result of the fact that the deposit pressure sensor tube 29 terminates in the interior of the gas injection tube 13, that is, short of the free end of the gas injection tube 13, it is achieved that the pressure being detected or measured at the measuring region is basically in a steady state without undue fluctuations which would be present if the end of the deposit pressure sensor tube 29 projected beyond the free end of the gas injection tube 13 and into the turbulent mixing zone existing at and downstream of the merger region 14.

Having so described the construction of the soot removal apparatus 12 and its disposition with respect to the exhaust tube 11 and to the substrate tube 10, the operation of the soot removal apparatus 12 during the chemical vapor deposition phase of the preform fabrication process will now be briefly discussed, together with the advantages obtained by constructing the soot removal apparatus 12 in the above-described manner in accordance with the present invention.

Just prior to the commencement of the chemical vapor deposition phase of the preform fabrication process, the pressure of the auxiliary gas admitted into the auxiliary port 31 is adjusted to the desired level at which the chemical vapor deposition process is known or found out to produce the best results in terms of the quality of the deposited layer or layers and the deposition speed. Then, the chemical vapor deposition phase of the preform fabrication process is initiated by causing the primary gaseous medium to flow through the interior of the substrate tube 10 and into the interior of the exhaust tube 11 for subsequent joint or mixed flow with the auxiliary gaseous medium through the space between the exterior of the gas injection tube 13 and the interior of the exhaust tube 11, and by commencing the rotation of the combination of the substrate tube 10 with the exhaust tube 11, as well as a movement of a heating source, especially a torch, arranged at the exterior of the substrate tube 10, in the longitudinal directions of the latter. When it is desired to commence the scraping action, which may be simultaneously with, subsequent to, or even prior to the initiation of the chemical vapor deposition phase of the preform fabrication process, the motor 15 is energized so that the tubular connecting element 20 is brought into rotation in the above-mentioned sense that is opposite to that in which the substrate tube 10 and exhaust tube 11 rotate during the chemical vapor deposition phase of the preform fabrication process. Since the coupling 26 permits the gas injection tube 13 to rest by its own weight at the above-mentioned bottom zone, the gas injection tube 13 will always be in contact either directly with the internal surface of the exhaust tube 11 or with any glass soot accumulated on such internal surface at the bottom zone. This means that the movement of the cooperating external surface of the gas injection tube 13 and the internal surface of the exhaust tube 11 at the bottom zone in mutually opposite circumferential directions will result in loosening of the accumulated glass soot at the respective affected surface, or in scraping off of such accumulated glass soot from the affected surface. Then, the loosened or scraped-off soot is entrained in the flow of the mixed gaseous medium through the interspace between the gas injection tube 13 and the exhaust tube 11 and out of the open end of the latter. It will be appreciated that, because of the reduction of the flow-through cross-section of the exhaust tube 11 due to the presence of the gas injection tube therein, and because of the addition of the auxiliary gaseous medium flow to the flow of the primary gaseous medium through the interior of the exhaust tube 11, the speed of flow of the mixture of the two gaseous media through the space between the internal surface of the exhaust tube 11 and the external surface of the gas injection tube 13 will be considerably higher than the speed of flow of merely the primary gaseous medium through the interior of the exhaust tube 11 as encountered during the traditional performance of the chemical vapor deposition phase of the preform fabrication process. This increased speed will counteract the tendency of the soot to settle in the interior of the exhaust tube by reducing the dwell time of the soot particles in the interior of the exhaust tube 11 and by keeping such soot particles aloft.

During the chemical vapor deposition phase of the preform fabrication process, the pressure at the free end of the gas injection tube 13 is being continuously or frequently monitored either by an operator observing the indications appearing at the deposit pressure manometer 30 or automatically by a control computer or a similar information processing equipment of a known construction, and any substantial change in this pressure is evaluated and, if need be, utilized for adjusting the operating parameters of the chemical vapor deposition phase of the preform fabrication process, such as the pressure or volume of the primary gaseous medium introduced into the interior of the substrate tube 10 or the pressure or volume of the auxiliary gaseous medium fed into the auxiliary port 31. Depending on the circumstances, this adjustment can be made by the operator on the basis of the information observed at the deposit pressure manometer 30, or by the control computer or similar equipment based directly on a signal which indicates the magnitude of the measured pressure. The latter approach is currently preferred, especially since such an information processing and/or control equipment is readily available since it is being used to control the various parameters of the chemical vapor deposition phase of the preform fabrication process, such as pressures, gas volumes, fuel-to-oxygen ratios of the torch and the like As a matter of fact, the provision of the soot removal apparatus 12 of the present invention and its connection to such information processing equipment constitutes a further step toward a full automation of the chemical vapor deposition optical preform fabrication process The introduction of the auxiliary gaseous medium to the merger region 14 achieves basically two advantages One of these advantages is that there is provided a gas interface zone in which the two gaseous media mix with one another, this interface zone being situated between the downstream end of the substrate tube 10 and the free end of the gas injection tube 13 and thus effectively separating the interior of the substrate tube 10 from the region at which the soot accumulates in the interior of the exhaust tube 11 This means that the loose glass soot present in the interior of the exhaust tube 11 will be prevented from re-entering the interior of the substrate tube 10 and thus from possibly contaminating the material of the layer being deposited on the internal surface of the substrate tube 10. The other important advantage of this expedient is that the introduction of the auxiliary gaseous medium results in a controllable increase in the pressure prevailing at the downstream end of the substrate tube 10, so that the chemical vapor deposition phase of the preform fabrication process can be performed at higher and controllable pressures with an increased efficiency of the chemical vapor deposition process. This results in a situation where less of the soot is produced to begin with, so that a lesser amount of such soot reaches the exhaust tube 11, and the danger of soot deposition in the interior of the exhaust tube 11 is further reduced While it is particularly advantageous to use the soot removal apparatus 12 for removing the soot from the interior of the exhaust tube 11 during the chemical vapor deposition phase of the preform fabrication process, and such use has been described above, the apparatus 12 can be used for different purposes as well during different phases of the optical preform fabrication process, especially for controlling the pressure prevailing in the interior of the exhaust tube 11 and thus indirectly the pressure encountered in the interior of the substrate tube 10 at the downstream end of the latter or throughout. So, for instance, the apparatus 12 can also be used during the collapse of the tubular formation resulting from the deposition of the layer or layers at the internal surface of the substrate tube 10 after the conclusion of the chemical vapor deposition phase of the preform fabrication process.

While we have described above the principles of our invention in connection with specific apparatus, it is to be clearly understood that this description is made only by way of example and not as a limitation to the scope of our invention as set forth in the objects thereof and in the accompanying claims.

We claim:

1. An arrangement comprising:
   a substrate tube in which a CVD reaction can occur during an optical fiber preform fabrication process and from which a primary gaseous medium carrying glass soot particles can be exhausted;
   an exhaust tube joined to said substrate tube for receiving the primary gaseous medium exhausted from said substrate tube;
   a gas injection tube including a tubular portion received in the exhaust tube with radial spacing therefrom except at a contact zone and having a free end disposed at the region of joinder of the exhaust tube with the substrate tube for discharging an auxiliary gaseous medium into said region;
   means for supplying the auxiliary gaseous medium into said gas injection tube for propagation through the same toward and out of said free end and into said region for mixing thereat with the emerging flow of the primary gaseous medium for joint flow through said spacing; and
   means for effecting relative circumferential movement between said contact zone and at least the exhaust tube to release any soot accumulations present at said contact zone for entrainment of the released soot in the joint flow through said spacing and out of said exhaust tube.

2. The arrangement as defined in claim 1 for use in a preform fabricating machine which jointly rotates the substrate and exhaust tubes about the longitudinal axis of the substrate tube, wherein said effecting means is operative for keeping said contact region substantially stationary in space as the exhaust tube moves past the same during the joint rotation thereof.

3. The arrangement as defined in claim 2, wherein said effecting means includes means for maintaining said tubular portion of said gas injection tube in position at the instantaneous bottom of the interior of the exhaust tube for said contact region to be situated at said bottom.

4. The arrangement as defined in claim 3, wherein said maintaining means includes a coupling which joins said supplying means with said gas injection tube and permits said tubular portion of said gas injection tube to maintain its position at said bottom.

5. The arrangement as defined in claim 1, and further comprising means for rotating said gas injection tube about its longitudinal axis to cause the external surface thereof to move circumferentially past said contact zone for releasing any soot accumulations thereat.

6. The arrangement as defined in claim 5, wherein said effecting means causes the internal surface of the exhaust tube to move with respect to said contact zone in one circumferential direction; and wherein said rotating means so rotates said gas injection tube that said external surface of said tubular portion of the gas injection tube moves past said contact zone in the opposite circumferential direction.

7. The arrangement as defined in claim 5, wherein said supplying means includes a rotary gas union connected to the end of the gas injection tube that is remote from said free end.

8. The arrangement as defined in claim 7, wherein said rotary gas union includes a stationary housing bounding an internal passage that communicates with at least one inlet port through which the auxiliary gaseous medium is supplied into said passage, and a tubular connecting element having one end portion sealingly received in said passage for rotation relative to said housing and another end portion located externally of said housing and connected to said remote end of said gas injection tube; and wherein said rotating means includes a motor and a transmission which is interposed between said motor and said other end portion of said connecting element and driving the latter in rotation in response to the energization of said motor.

9. The arrangement as defined in claim 8, and further comprising a flexible coupling sealingly connected to said other end of said connecting element and to said remote end of said gas injection tube and operative for causing said gas injection tube to share in the rotation of said connecting element while permitting the longitudinal axis of said gas injection element to deviate in a limited range from that of said connecting element.

10. The arrangement as defined in claim 8, and further comprising means for monitoring the pressure prevailing at said free end of said gas injection tube, including pressure measuring means and a tubular conduit extending from said pressure measuring means through said passage and the interior of said gas injection tube to the region of said free end of the latter and operative for conveying the pressure prevailing at such region to said pressure measuring means to be measured thereby.

11. The arrangement as defined in claim 10, wherein said tubular conduit terminates in the interior of said gas injection tube at a predetermined distance from said free end of the latter.

* * * * *